(12) United States Patent
Yu et al.

(10) Patent No.: US 12,002,484 B2
(45) Date of Patent: Jun. 4, 2024

(54) METHOD AND APPARATUS FOR POST-PROCESSING AUDIO SIGNAL, STORAGE MEDIUM, AND ELECTRONIC DEVICE

(71) Applicant: TENCENT TECHNOLOGY (SHENZHEN) COMPANY LIMITED, Shenzhen (CN)

(72) Inventors: Yang Yu, Shenzhen (CN); Yu Chen, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 120 days.

(21) Appl. No.: 17/736,797

(22) Filed: May 4, 2022

(65) Prior Publication Data

US 2022/0262388 A1  Aug. 18, 2022

Related U.S. Application Data

(63) Continuation of application No. PCT/CN2021/086179, filed on Apr. 9, 2021.

(30) Foreign Application Priority Data

May 14, 2020 (CN) .......................... 202010404621.1

(51) Int. Cl.
*G10L 21/0232* (2013.01)
*G10L 21/0208* (2013.01)
(Continued)

(52) U.S. Cl.
CPC ...... *G10L 21/0232* (2013.01); *G10L 21/0208* (2013.01); *G10L 21/0224* (2013.01); *H04R 3/002* (2013.01)

(58) Field of Classification Search
CPC ............. G10L 21/0232; G10L 21/0208; G10L 21/0224; H04R 3/002
See application file for complete search history.

(56) References Cited

U.S. PATENT DOCUMENTS 4,443,660 A    4/1984  Delong
8,676,361 B2*  3/2014  Paddock ................... H04S 7/30
                                                   381/106
(Continued)

FOREIGN PATENT DOCUMENTS

CN      101345052 A     1/2009
CN      101604527 A    12/2009
(Continued)

OTHER PUBLICATIONS

Wang et al., "WearID: Wearable-Assisted Low-Effort Authentication to Voice Assistants using Cross-Domain Speech Similarity," arXiv:2003.09083v2 [cs.HC], Apr. 9, 2020, available at: https://doi.org/10.48550/arXiv.2003.09083 (Year: 2020).*
(Continued)

*Primary Examiner* — Michelle M Koeth
(74) *Attorney, Agent, or Firm* — ANOVA LAW GROUP, PLLC

(57) ABSTRACT

This application discloses a method and an apparatus for processing an audio signal. The method includes obtaining a first speech signal acquired by a first device; performing frame blocking on the first speech signal, to obtain multiple speech signal frames; converting the multiple speech signal frames into multiple first frequency domain signal frames; performing aliasing processing on a first sub-frequency domain signal frame among the multiple first frequency domain signal frames with a frequency lower than or equal to a target frequency threshold, and retaining a second sub-frequency domain signal frame among the multiple first frequency domain signal frames with a frequency higher
(Continued)

than the target frequency threshold, to obtain multiple second frequency domain signal frames, the target frequency threshold being related to a sampling frequency of a second device; and performing frame fusion on the multiple second frequency domain signal frames, to obtain a second speech signal.

18 Claims, 8 Drawing Sheets

(51) Int. Cl.
  *G10L 21/0224* (2013.01)
  *H04R 3/00* (2006.01)

(56) References Cited

U.S. PATENT DOCUMENTS

| | | | |
|---|---|---|---|
| 8,812,327 B2 | 8/2014 | Virette et al. | |
| 9,418,666 B2 | 8/2016 | Son et al. | |
| 10,477,313 B2* | 11/2019 | Janse | H04R 3/04 |
| 10,720,170 B2* | 7/2020 | Ghido | G10L 19/008 |
| 11,397,083 B1* | 7/2022 | Larson | G01C 19/50 |
| 2017/0064246 A1 | 3/2017 | Kline et al. | |
| 2021/0383817 A1* | 12/2021 | Ekstrand | G10L 21/04 |
| 2022/0191635 A1* | 6/2022 | Shlomot | G10L 25/06 |

FOREIGN PATENT DOCUMENTS

| | | | |
|---|---|---|---|
| CN | 102576536 A | 7/2012 | |
| CN | 103079196 A | 5/2013 | |
| CN | 104050964 A * | 9/2014 | H04B 17/00 |
| CN | 106713611 A | 5/2017 | |
| CN | 111294367 A | 6/2020 | |
| IN | 104361847 A | 2/2015 | |

OTHER PUBLICATIONS

Machine English translation of CN-104050964-A, 9 pages. (Year: 2014).*
Karami et al., "Windowed overlapped frequency domain block filtering approach for direct sequence signal acquisition," Digital Communications and Networks, vol. 4, Issue 3, 2018, pp. 209-216, ISSN 2352-8648, https://doi.org/10.1016/j.dcan.2017.04.006 (Year: 2018).*
Robertson, "Evaluate Window Functions for the Discrete Fourier Transform," DSPRelated.com, Dec. 18, 2018, available at: https://www.dsprelated.com/showarticle/1211.php (Year: 2018).*
China National Intellectual Property Administration (CNIPA) Office Action 1 for 202010404621.1, dated Jun. 29, 2020 11 Pages (including translation).
The World Intellectual Property Organization (WIPO) International Search Report for PCT/CN2021/086179 dated Jul. 7, 2021 5 Pages (including translation).
Wenjuan Li, "A Study of Encryption Technology Based on the Analog Voice," Chinese Master's Theses Full-text Database, Information Science and Technology, No. 4, Apr. 15, 2016 (Apr. 15, 2016). 75 pages.
European Patent Office European Search Report for Application No. 21804205.9-1210 dated Dec. 7, 2022 6 pages.
Wang, et al., "WearID: Wearable-Assisted Low-Effort Authentication to Voice Assistants using Cross-Domain Speech Similarity", ARXIV. 2003.09083V2, Mar. 20, 2020.

* cited by examiner

METHOD AND APPARATUS FOR POST-PROCESSING AUDIO SIGNAL, STORAGE MEDIUM, AND ELECTRONIC DEVICE

RELATED APPLICATIONS

This application is a continuation application of PCT Application No. PCT/CN2021/086179, filed on Apr. 9, 2021, which in turn claims priority to Chinese Patent Application No. 202010404621.1, entitled "METHOD AND APPARATUS FOR POST-PROCESSING AUDIO SIGNAL, STORAGE MEDIUM, AND ELECTRONIC DEVICE" filed on May 14, 2020. The two applications are incorporated by reference in their entirety.

FIELD OF THE TECHNOLOGY

This application relates to the field of computers, and specifically, to a method and an apparatus for post-processing an audio signal, a storage medium, and an electronic device.

BACKGROUND OF THE DISCLOSURE

In the current related art, during a speech transmission service, an electrical signal is converted into an audio signal by electroacoustic transducers such as a speaker, which will cause a mainboard to vibrate. The vibration information can be captured by microelectromechanical system (MEMS) sensors carried on the same mainboard or closely connected to the mainboard, such as an accelerometer, and a gyroscope. The vibration information is then used to restore an original speech signal through a specific speech reconstruction algorithm. If an attacker obtains the access authority to the MEMS sensor, it is possible for the attacker to eavesdrop on the speech. A current method for preventing side-channel eavesdropping is to limit a sampling rate of a terminal MEMS sensor. For example, the accelerometers are prohibited from acquiring signals over 50 Hz, or to limit the authority of terminal MEMS sensors. For example, applications (APPs) using MEMS need to obtain user authorization. However, the method of limiting the sampling rates of the MEMS sensors will cause some applications requiring high sampling rates to fail to operate normally. Therefore, the method for protecting from eavesdropping from a sound pickup side in the related art needs to limit software and hardware of the terminal, which further limits the use of such applications.

SUMMARY

According to embodiments of this application, a method and an apparatus for post-processing an audio signal, a storage medium, and an electronic device are provided.

One aspect of this application provides a method for processing an audio signal, performed by an electronic device. The method includes obtaining a first speech signal acquired by a first device; performing frame blocking on the first speech signal, to obtain multiple speech signal frames; converting the multiple speech signal frames into multiple first frequency domain signal frames; performing aliasing processing on a first sub-frequency domain signal frame among the multiple first frequency domain signal frames with a frequency lower than or equal to a target frequency threshold, and retaining a second sub-frequency domain signal frame among the multiple first frequency domain signal frames with a frequency higher than the target frequency threshold, to obtain multiple second frequency domain signal frames, the target frequency threshold being related to a sampling frequency of a second device; and performing frame fusion on the multiple second frequency domain signal frames, to obtain a second speech signal.

Another aspect of this application provides an apparatus for processing an audio signal. The apparatus includes an obtaining module, configured to obtain a first speech signal acquired by a first device; a frame blocking module, configured to perform frame blocking on the first speech signal, to obtain multiple speech signal frames; a conversion module, configured to convert the multiple speech signal frames into multiple first frequency domain signal frames; an aliasing module, configured to perform aliasing processing on a first sub-frequency domain signal frame among the multiple first frequency domain signal frames with a frequency lower than or equal to a target frequency threshold, and retaining a second sub-frequency domain signal frame among the multiple first frequency domain signal frames with a frequency higher than the target frequency threshold, to obtain multiple second frequency domain signal frames, the target frequency threshold being related to a sampling frequency of a second device; and a frame fusion module, configured to perform frame fusion on the multiple second frequency domain signal frames, to obtain a second speech signal.

Another aspect of this application provides a non-transitory computer-readable storage medium, storing computer-readable instructions, the computer-readable instructions, when being executed by the processor, causing a processor to perform the operations in the foregoing method for processing the audio signal.

Details of one or more embodiments of this application are provided in the accompanying drawings and descriptions below. Other features, objectives, and advantages of this application are illustrated in the specification, the accompanying drawings, and the claims.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from these accompanying drawings without creative efforts.

DESCRIPTION OF EMBODIMENTS

Figure 1:
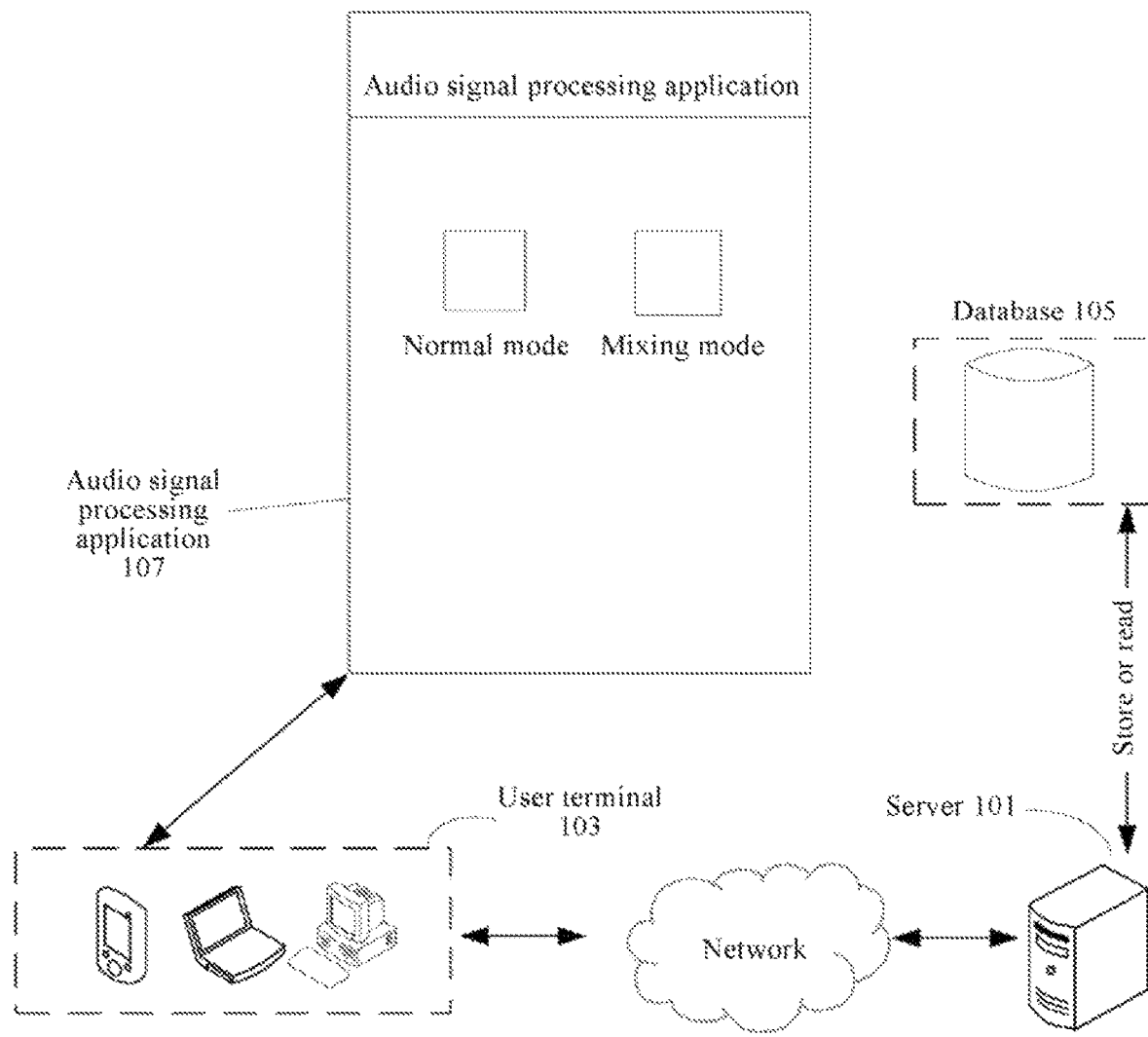
FIG. 1 is a schematic diagram of an application environment of a method for processing an audio signal according to an embodiment.

To make a person skilled in the art understand this application better, the following describes the technical solutions in the embodiments of the present disclosure with reference to the accompanying drawings in the embodiments of the present disclosure. Apparently, the described embodiments are merely some but not all of the embodiments of this application. All other embodiments obtained by a person of ordinary skill in the art based on the embodiments of this application without creative efforts fall within the protection scope of this application.

In the specification, claims, and accompanying drawings of this application, the terms "first", "second", and so on are intended to distinguish between similar objects but do not necessarily indicate a specific order or sequence. It is to be understood that the data termed in such a way is interchangeable in proper circumstances, so that the embodiments of this application described herein can be implemented in other sequences than the sequence illustrated or described herein. Moreover, the terms "include", "contain", and any other variants thereof mean to cover the non-exclusive inclusion. For example, a process, method, system, product, or device that includes a list of steps or units is not necessarily limited to those steps or units that are clearly listed, but may include other steps or units not expressly listed or inherent to such a process, method, system, product, or device.

First, some terms used in the embodiments of this application are described.

Cloud technology is a collective name of a network technology, an information technology, an integration technology, a management platform technology, an application technology, and the like based on an application of a cloud computing business model, and may form a resource pool, which is flexible and convenient. A backend service of a technical network system requires a large amount of computing and storage resources, such as video websites, image websites, and other portal websites. As the Internet industry develops, each article may have its own identifier in the future and needs to be transmitted to a backend system for logical processing. Data at different levels is separately processed, and data in various industries requires strong system support, which can only be implemented through cloud computing.

Cloud security is a collective name of security software, hardware, users, institutions, and security cloud platforms based on cloud computing business model applications. The cloud security integrates emerging technologies and concepts such as parallel processing, grid computing, unknown virus behavior determination and the like. The cloud security monitors abnormalities of software behavior in a network through a large number of mesh clients, obtains latest information of Trojans and malicious programs on the Internet, transmits the information to a server for automatic analysis and processing, and then distributes virus and Trojan solutions to each client.

Research directions of the cloud security include: 1. Cloud computing security, which mainly studies how to ensure security of the cloud and various applications on the cloud, including cloud computer system security, secure storage and isolation of user data, user access authentication, information transmission security, network attack protection, compliance audit, and the like; 2. Cloudification of security infrastructure, which mainly studies how to use cloud computing to build and integrate security infrastructure resources and optimize security protection mechanisms, including constructing ultra-large-scale security event and information acquisition and processing platforms through the cloud computing technology, to implement acquisition and correlation analysis of massive information, and improve the security incident handling capability and risk control capability of the entire network; 3. Cloud security service, which mainly studies various security services provided to users based on cloud computing platforms, such as anti-virus services.

The cloud security can be applied to cloud technology fields including, but not limited to, cloud conferences or cloud calls.

Cloud conference is an efficient, convenient and low-cost conference format based on the cloud computing technology. Users only need to perform simple and easy operations through Internet interfaces, and can quickly, efficiently and synchronously share speech, data files and videos with teams and customers around the world. Complex technologies such as data transmission and processing in conferences are provided by a cloud conference service provider to assist in operations of the users.

At present, domestic cloud conferences mainly focus on service content of a software as a service (SaaS) mode, including calls, networks, videos and other service forms. Video conferences based on the cloud computing are called cloud conferences.

In the era of cloud conferences, data transmission, processing, and storage are all performed by computer resources of video conference providers. The users do not need to purchase expensive hardware or install cumbersome software. The users only need to open browsers and log in to corresponding interfaces to conduct efficient teleconferences.

A cloud conference system supports multi-server dynamic cluster deployment and provides a plurality of high-performance servers, which greatly improves stability, security and availability of conferences. In recent years, because video conferences can greatly improve communication efficiency, continuously reduce communication costs, and bring an upgrade in internal management level, video conferences are popular among many users and have been widely used in a plurality of fields such as government, military, transportation, transmission, finance, operators, education, enterprises and so on. There is no doubt that after using the cloud computing, the video conferences will be more competitive in terms of convenience, speed and ease of use, which will surely stimulate arrival of a new upsurge in video conference applications.

A cloud call center is a call center system based on the cloud computing technology. An enterprise does not need to purchase any software or hardware systems, but only needs to have basic conditions such as personnel and venues to quickly own a call center belonging to the enterprise. Software and hardware platforms, communication resources, routine maintenance and services are provided by server providers. The cloud call center has a plurality of features such as short construction period, low investment, low risk, flexible deployment, strong system capacity scalability, low operation and maintenance cost and so on. Whether the cloud call center is a telemarketing center or a customer service center, by renting services on demand, the enterprise can build a call center system with comprehensive, stable and reliable functions, where the seats can be distributed all over the country to receive calls all over the country.

Side-channel eavesdropping takes advantage of the vulnerability at the time when an electrical signal is converted into an audio signal by electroacoustic transducers such as a speaker, a mainboard will vibrate. The vibration information can be captured by microelectromechanical system (MEMS) sensors carried on the same mainboard or closely connected to the mainboard, such as an acceleration transducer and a gyroscope, to restore an original speech signal through a specific speech reconstruction algorithm. If an attacker obtains an access authority to the MEMS sensors (which usually easier to obtain than an access authority to a microphone), the attacker may make an attack through an eavesdropping behavior, which damages the security of the speech transmission.

Speech post-processing refers to the final operation in a digital speech signal processing process. A speech signal processed by this operation will be directly transmitted to digital-to-analog conversion devices such as a sound card.

Haas effect: similar to vision persistence of human eye, there is also a persistence of hearing, and a persistence time is about 20 ms. When sound waves stimulate a human ear, appearance and disappearance of hearing requires a certain process. That is, the appearance and disappearance of hearing has certain inertia, and sound wave stimulation will remain in the hearing for a period of time. The Haas effect refers to a phenomenon that people cannot distinguish certain delayed sounds. A sound pressure level of the delayed sound is lower than that of a first-arriving sound, and no matter where the delayed sound comes from, as long as the delayed sound is less than 17 ms, people cannot feel the existence of delay. When a direction of the delayed sound is close to the first-arriving sound, a delay of 30 ms will not be felt. Only when the delay is greater than 50 ms can people feel the delayed sound.

This application is described below with reference to the embodiments.

In an embodiment, a method for processing an audio signal may be applied to a hardware environment including a server 101 and a user terminal 103 shown in FIG. 1. As shown in FIG. 1, the server 101 is connected to the user terminal 103 through a network, and can be used for providing services for the user terminal or a client installed on the user terminal. A target client may be a video client, an instant messaging client, a browser client, an educational client, or the like. A database 105 can be disposed on a server or independently disposed from the server, configured to provide a data storage service for the server 101. The foregoing network may include, but is not limited to: a wired network, and a wireless network, where the wired network includes: a local area network, a metropolitan area network and a wide area network, and the wireless network includes: Bluetooth, WIFI and other networks implementing wireless communication. The user terminal 103 may be a terminal configured with a target client, and may include, but is not limited to, at least one of the following: a mobile phone (such as an Android mobile phone, an iOS mobile phone, and so on), a notebook computer, a tablet computer, a palmtop computer, a mobile internet device (MID), a PAD, a desktop computer, a smart TV, and so on. The foregoing server can be a single server, or a server cluster including a plurality of servers, or a cloud server. An audio signal post-processing application 107 is displayed through the user terminal 103, and an audio signal post-processing service can be used for protecting against channel eavesdropping attacks through an entrance of the audio signal post-processing application 107 configured on the terminal. The foregoing description is merely an example, and is not limited in this embodiment.

Referring to FIG. 1, an audio signal processing interface of the audio signal post-processing application 107 configured on the terminal displays trigger controls respectively corresponding to a normal mode and a mixing mode. The trigger control corresponding to the normal mode is used for triggering conventional digital speech signal processing on an original speech signal. For example, the original speech signal is directly transmitted to a digital-to-analog conversion device such as a sound card. For public speech information that does not need to be confidentially transmitted, such as free online teaching courses, the terminal can receive a first trigger operation performed by a user on the trigger control corresponding to the normal mode on the audio signal processing interface, and perform conventional digital speech signal processing on the speech signal according to the first trigger operation. The trigger control of the mixing mode is used for triggering mixing processing of the original speech signal, that is, triggering to use the audio signal post-processing method of this application to perform mixing processing on a first speech signal (that is, the original speech signal) to obtain a second speech signal. For private speech information that needs to be securely transmitted, such as a teleconference, the terminal can receive a second trigger operation performed by the user on the trigger control corresponding to the mixing mode on the audio signal processing interface, and perform mixing processing on the original speech signal according to the second trigger operation.

Figure 2:
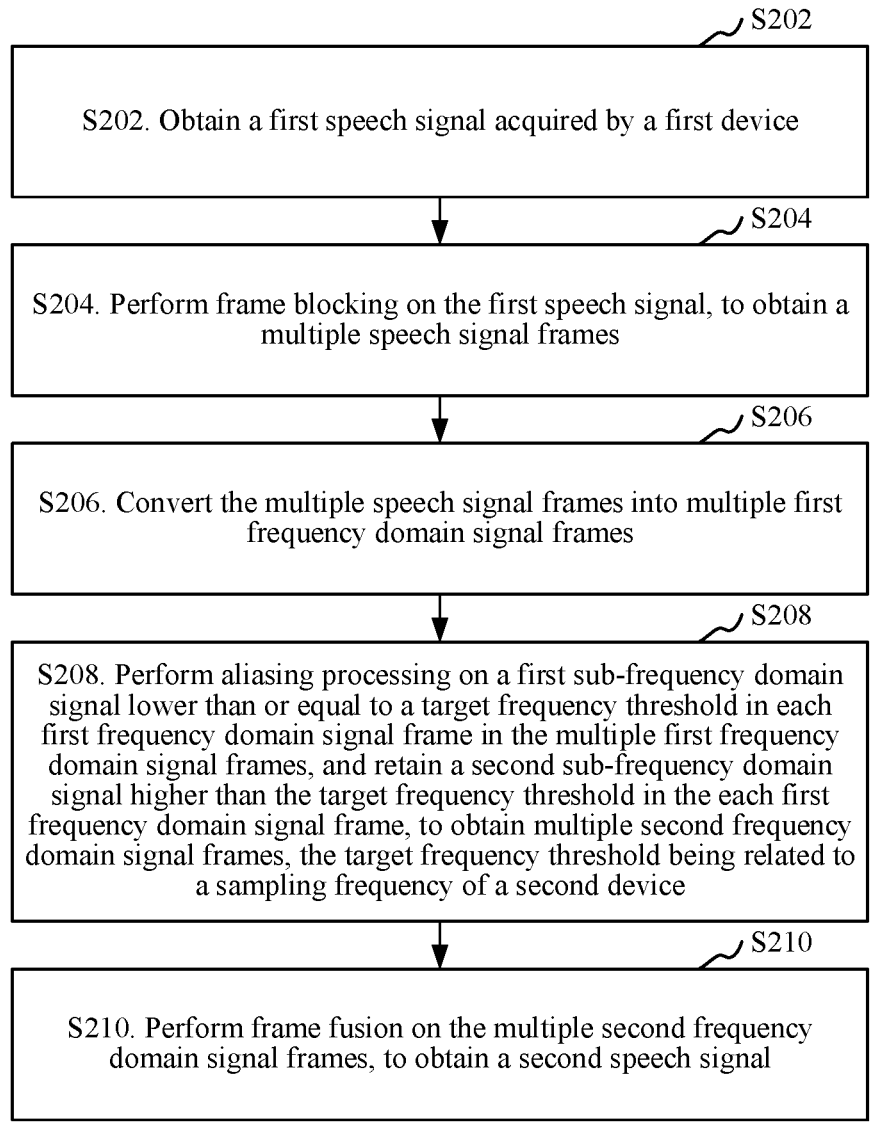
FIG. 2 is a schematic flowchart of a method for processing an audio signal according to an embodiment.

In an embodiment, as shown in FIG. 2, a method for post-processing an audio signal is provided, including the following operations:

S202. Obtain a first speech signal acquired by a first device.

S204. Perform frame blocking on the first speech signal, to obtain multiple speech signal frames.

S206. Convert the multiple speech signal frames into multiple first frequency domain signal frames.

S208. Perform aliasing processing on a first sub-frequency domain signal lower than or equal to a target frequency threshold in each first frequency domain signal frame in the multiple first frequency domain signal frames, and retain a second sub-frequency domain signal higher than the target frequency threshold in the each first frequency domain signal frame, to obtain multiple second frequency domain signal frames, the target frequency threshold being related to a sampling frequency of a second device.

S210. Perform frame fusion on the multiple second frequency domain signal frames, to obtain a second speech signal.

The first speech signal may be obtained by one or more audio acquisition devices, or created by audio generation software. The target frequency may include, but is not limited to, an upper limit of a sampling frequency of a MEMS sensor that obtains audio vibrations; the second device may include, but is not limited to, MEMS sensors.

In the foregoing method for post-processing an audio signal, a first speech signal acquired by a first device is obtained; frame blocking is performed on the first speech signal, to obtain multiple speech signal frames, and the multiple speech signal frames are converted into the multiple first frequency domain signal frames; aliasing processing is performed on the first sub-frequency domain signal lower than or equal to a target frequency threshold in each first frequency domain signal frame in the multiple first frequency domain signal frames, and the second sub-frequency domain signal higher than the target frequency threshold in the each first frequency domain signal frame is retained, to obtain multiple second frequency domain signal frames; and frame fusion is performed on the multiple second frequency domain signal frames, to obtain a second speech signal. Accordingly, by aliasing a low-frequency speech signal of an output speech signal, a MEMS sensor sensitive to low frequency cannot correctly restore an original speech signal after acquiring vibration information. Therefore, a speech signal on a playback side is protected without any hardware and software restrictions on the MEMS sensor, thereby solving the technical problems in the related art that terminal software and hardware need to be restricted when the speech signal is protected from attacks and eavesdropping and an applicable scope of a processing method is relatively small.

In an embodiment, the performing aliasing processing on a first sub-frequency domain signal lower than or equal to a target frequency threshold in each first frequency domain signal frame in the multiple first frequency domain signal frames, and retaining a second sub-frequency domain signal higher than the target frequency threshold in the each first frequency domain signal frame, to obtain multiple second frequency domain signal frames includes: alternately enhancing and attenuating the first sub-frequency domain signal in the each first frequency domain signal frame, to obtain a third sub-frequency domain signal, and retaining the second sub-frequency domain signal in the each first frequency domain signal frame, to obtain the multiple second frequency domain signal frames.

In an embodiment, an electronic device performing aliasing processing on the first sub-frequency domain signal that is lower than or equal to the target frequency threshold in each first frequency domain signal frame in the multiple first frequency domain signal frames may include, but is not limited to: alternately enhancing and attenuating an adjacent frequency domain signal frame of each first frequency domain signal frame in the multiple first frequency domain signal frames.

In an embodiment, an electronic device may use the Haas effect of human ears to alternately enhance and attenuate the first sub-frequency domain signal that is lower than or equal to the target frequency threshold in each first frequency domain signal frame in the multiple first frequency domain signal frames. For example, according to the Haas effect, an auditory persistence time of human ears is about 20 milliseconds. Therefore, the first speech signal may be divided into multiple speech signal frames with frame duration of about 20 milliseconds, and then subsequent processing is performed, to ensure that the performed low-frequency aliasing is not perceptible to human ears. The frame duration can be preset by a system, or monitored and identified according to different human ears.

In this embodiment, the aliasing processing is performed by using the Haas effect of human ears to alternately enhance and attenuate the first sub-frequency domain signal in each first frequency domain signal frame, thereby outputting the second speech signal obtained by the aliasing processing. Low frequency band of the second speech signal is obtained by the aliasing processing. Therefore, even if the vibration information of the output speech signal is acquired by a MEMS sensor that is sensitive to low frequency, the MEMS sensor cannot correctly restore an original speech signal, thereby ensuring data security of the speech signal. At the same time, by alternately enhancing and attenuating low-frequency signals in adjacent frames, complexity of aliasing is improved, and subjective influence of added aliasing on human ears is offset by the Haas effect. Accordingly, the technical problems in the related art that terminal software and hardware need to be restricted when the speech signal is protected from attacks and eavesdropping and an applicable scope of a processing method is relatively small can be solved, and a technical effect of ensuring data security of the speech signal is achieved.

In an embodiment, the multiple second frequency domain signal frames satisfy the following relationship:

$$X'_w[k, n] = \begin{cases} X_w[k, n]H[k, n], n \le f_{th} \\ X_w[k, n], n > f_{th} \end{cases}$$

H[k,n] is a low-frequency aliasing function of a $k^{th}$ frame, $f_{th}$ represents the target frequency threshold, and $X_w[k,n]$ is used for representing a $k^{th}$ first frequency domain signal frame; when $n \le f_{th}$, $X_w[k,n]$ is used for representing a first sub-frequency domain signal in the $k^{th}$ first frequency domain signal frame; when $n > f_{th}$, $X_w[k,n]$ is used for representing a second sub-frequency domain signal in the $k^{th}$ first frequency domain signal frame, $X_w[k,n]H[k,n]$ is used for representing a third sub-frequency domain signal obtained after aliasing processing is performed on the first sub-frequency domain signal in the $k^{th}$ first frequency domain signal frame, and $X_w'[k,n]$ is used for representing a $k^{th}$ second frequency domain signal frame.

In this embodiment, first, each first frequency domain signal frame is compared with the target frequency threshold. When a first frequency domain signal frame is less than or equal to the target frequency threshold, the electronic device multiplies the first sub-frequency domain signal in the first frequency domain signal frame with the low-frequency aliasing function, to obtain the third sub-frequency domain signal. The first sub-frequency domain signal in each first frequency domain signal frame can be alternately enhanced and attenuated by the low-frequency aliasing function, and no processing is performed on the second sub-frequency domain signal in the first frequency domain signal frame that is greater than the target frequency threshold.

In an embodiment, the low-frequency aliasing function H[k,n] satisfies a property of parity frame gain cancellation, and without loss of generality, an implementation of H[k,n] is as follows:

$$H[2k+1, n] = \frac{1}{H[2k, n]}$$

$$H[2k, n] = \mathcal{D}[k, n]$$

$\mathcal{D}$[k,n] is a filter, and an odd-numbered frame of H[k,n] is a reciprocal of a corresponding even-numbered frame.

In addition to being applied to multiplication on $X_w[k,n]$, the low-frequency aliasing function H[k,n] can further be applied to addition or other operations on $X_w[k,n]$, for example:

$$X'_w[k, n] = \begin{cases} X_w[k, n] + H[k, n], n \le f_{th} \\ X_w[k, n], n > f_{th} \end{cases}$$

Of course, in addition to satisfying the property of parity frame gain cancellation by making the odd-numbered and even-numbered frames reciprocal of each other, H[k,n] may further use other methods such as addition and subtraction gain cancellation, for example:

$$H[2k+1, n] = -H[2k, n]$$

$$H[2k, n] = \mathcal{D}[k, n]$$

where a filter $\mathcal{D}$ [k,n] may include, but is not limited to, a filter configured to increase uncertainty, which may be time-variant or time-invariant, or a filter with random or fixed parameters. The above is just an example, and filters for performing filtering may include one or a combination of the above.

In this embodiment, by using the low-frequency aliasing function to alternately enhance and attenuate the low-frequency signal, vibration information of the speech signal added with low-frequency aliasing is ensured. Therefore, even if the speech signal after the aliasing is acquired by a MEMS sensor sensitive to low frequency, the MEMS sensor cannot correctly restore an original speech signal. Therefore, the technical problems in the related art that terminal software and hardware need to be restricted when the speech signal is protected from attacks and eavesdropping and an applicable scope of a processing method is relatively small can be solved, and a technical effect of ensuring data security of the speech signal is implemented.

In an embodiment, the multiple second frequency domain signal frames satisfy the following relationship:

$$X'_w[k, n] = \begin{cases} X_w[k, n] + H[k, n], & n \le f_{th} \\ X_w[k, n], & n > f_{th} \end{cases}$$

H[k,n] is a low-frequency aliasing function of a $k^{th}$ frame, $f_{th}$ represents the target frequency threshold, and $X_w[k,n]$ is used for representing a $k^{th}$ first frequency domain signal frame; when $n \le f_{th}$, $X_w[k,n]$ is used for representing a first sub-frequency domain signal in the $k^{th}$ first frequency domain signal frame; when $n > f_{th}$, $X_w[k,n]$ is used for representing a second sub-frequency domain signal in the $k^{th}$ first frequency domain signal frame, $X_w[k,n]+H[k,n]$ is used for representing a third sub-frequency domain signal obtained after aliasing processing is performed on the first sub-frequency domain signal in the $k^{th}$ first frequency domain signal frame, and $X_w'[k,n]$ is used for representing a $k^{th}$ second frequency domain signal frame.

Specifically, a method for obtaining the third sub-frequency domain signal by the electronic device may include, but is not limited to, adding the first sub-frequency domain signal in the first frequency domain signal and a low-frequency aliasing function, to obtain an aliased third sub-frequency domain signal.

In this embodiment, by using the low-frequency aliasing function to alternately enhance and attenuate the low-frequency signal, vibration information of the speech signal added with low-frequency aliasing is ensured. Therefore, even if the aliased speech signal is acquired by a MEMS sensor sensitive to low frequency, the MEMS sensor cannot correctly restore an original speech signal. Therefore, the technical problems in the related art that terminal software and hardware need to be restricted when the speech signal is protected from attacks and eavesdropping and an applicable scope of a processing method is relatively small can be solved, and an improved technical effect of ensuring data security of the speech signal is implemented.

In an embodiment, the low-frequency aliasing function H[k,n] of a $k^{th}$ frame satisfies the following relationship:

$$H[2m + 1, n] = \frac{1}{H[2m, n]}$$

$$H[2m, n] = D[m, n]$$

$\mathcal{D}$ [m,n] is a filter, H[k,n] when k is an odd number is a reciprocal of H[k,n] when k is an even number, and k includes 2m+1 and 2m.

Specifically, when the electronic device multiplies the first sub-frequency domain signal in the first frequency domain signal and the low-frequency aliasing function through the low-frequency aliasing function, to obtain the aliased third sub-frequency domain signal, the low-frequency aliasing function satisfies that H[k,n] when k is an odd number is a reciprocal of H[k,n] when k is an even number.

In an embodiment, the low-frequency aliasing function H[k,n] of a $k^{th}$ frame satisfies the following relationship:

$$H[2m + 1, n] = -H[2m, n]$$

$$H[2m, n] = \mathcal{D}[m, n]$$

$\mathcal{D}$ [m,n] is a filter, H [k,n] when k is an odd number is a negative number of H[k,n] when k is an even number, and the k includes 2m+1 and 2m.

Specifically, when the electronic device adds the first sub-frequency domain signal in the first frequency domain signal and the low-frequency aliasing function through the low-frequency aliasing function, to obtain the aliased third sub-frequency domain signal, the low-frequency aliasing function satisfies that H[k,n] when k is an odd number is a negative number of H[k,n] when k is an even number.

In an embodiment, the performing frame blocking on the first speech signal to obtain multiple speech signal frames includes: dividing the first speech signal into the multiple speech signal frames according to frame duration determined based on a Haas effect and a preset sampling frequency;

the converting multiple speech signal frames into multiple first frequency domain signal frames includes: adding an analysis window $h_a$ to each speech signal frame in the multiple speech signal frames to obtain multiple first windowed signals; and performing discrete Fourier transform on each first windowed signal frame in the multiple first windowed signals to obtain the multiple first frequency domain signal frames; and the performing frame fusion on the multiple second frequency domain signal frames to obtain a second speech signal includes: performing inverse discrete Fourier transform on each second frequency domain signal frame in the multiple second frequency domain signal frames, to obtain multiple first time domain signal frames; adding a synthesis window $h_s$ to each first time domain signal frame in the multiple first time domain signal frames, to obtain multiple second windowed signal frames; and performing frame fusion processing on the multiple second windowed signal frames, to obtain the second speech signal.

Specifically, discrete Fourier transform may be performed on each first windowed signal frame in the multiple first windowed signals by using the following formula, to obtain the multiple first frequency domain signal frames:

$$X_w[k, n] = \sum_i x[i] h_a[i - kM] e^{\frac{-j2\pi i n}{N}}$$

$x[i]h_a[i-kM]$ is used for representing a $k^{th}$ first windowed signal frame in the multiple first windowed signals, and $X_w[k,n]$ represents the multiple first frequency domain signal frames represented by the frequency domain.

Accordingly, the discrete Fourier transform can be used for converting each windowed signal frame represented by the time domain into multiple first frequency domain signal frames represented by the frequency domain, which can implement the technical effect of facilitating the subsequent low-frequency aliasing on the multiple first frequency domain signal frames.

Specifically, each second frequency domain signal frame in the multiple second frequency domain signal frames may be converted into multiple first time domain signal frames represented by the time domain by inverse discrete Fourier transform through the following formula:

$$x'_w[k, n] = \frac{1}{N} \sum_{i=0}^{N-1} X'_w[k, i] e^{\frac{j2\pi i n}{N}}$$

$X_w'[k, i]$ is used for representing each second frequency domain signal frame in the multiple second frequency domain signal frames, and $x_w'[k,n]$ is the multiple first time domain signal frames represented by the time domain.

Accordingly, the inverse discrete Fourier transform can be used for converting the second frequency domain signal represented by the frequency domain into the first time domain signal represented by the time domain, which can implement the technical effect of facilitating subsequently adding the synthesis window to the foregoing first time domain signal for synthesis.

Figure 3:
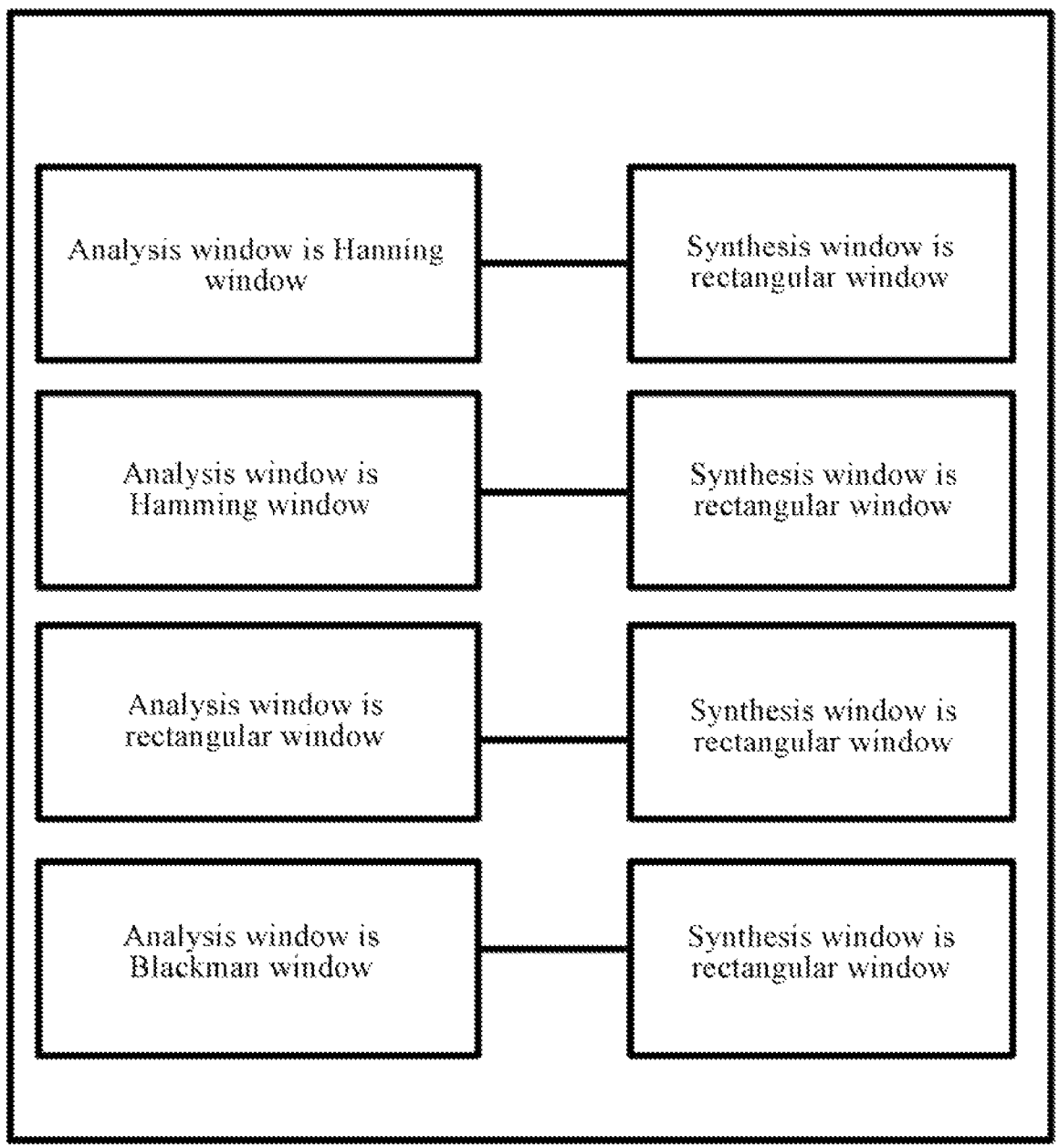
FIG. 3 is a schematic diagram of an analysis window and a synthesis window according to an embodiment.

In an embodiment, an analysis window $h_a$ and a synthesis window $h_s$ may include, but are not limited to, a Hanning window, a rectangular window, a Hamming window, a Blackman window, and so on. For example, FIG. 3 is a schematic diagram of a method for post-processing an audio signal according to an embodiment of the present disclosure. As shown in FIG. 3, the method may include a plurality of combinations in FIG. 3. The foregoing description is merely an example, and is not limited in this application.

In an embodiment, frame length N, the analysis window $h_a$ and the synthesis window $h_s$ satisfy the following relationship:

$$\sum_{n=0}^{N-1} h_a(n) h_s(n) = 1$$

$h_a(n)$ is used for representing an $n^{th}$ item in the analysis window $h_a$, and $h_s(n)$ is used for representing an $n^{th}$ item in the synthesis window $h_s$.

In this embodiment, the frame length N, the analysis window $h_a$ and the synthesis window $h_s$ satisfy a perfect reconstruction criterion, so that actual content of the audio signal is not damaged or distorted during audio signal post-processing on the speech signal.

In an embodiment, a $k^{th}$ first windowed signal frame in the multiple first windowed signals satisfies the following relationship:

$$x[n]h_a[n - kM], kM \leq n \leq kM + (N - 1)$$

M represents a quantity of overlapping sampling points of adjacent frames in the multiple speech signal frames, x[n] is used for representing an $n^{th}$ value in a $k^{th}$ first windowed signal frame, and the analysis window $h_a$ includes:

$$h_a[n] = \begin{cases} \frac{1}{2}\left(1 - \cos\frac{2\pi n}{N-1}\right), & 0 \leq n \leq N-1 \\ 0, & n < 0 \text{ or } n > N-1 \end{cases}$$

$h_a[n]$ is used for representing an $n^{th}$ item in the analysis window $h_a$, and $h_a[n-kM]$ is used for representing an $(n-kM)^{th}$ item in the analysis window $h_a$.

Specifically, for example, the analysis window is a Hanning window, and the description is shown in the above formula. Each speech signal frame is windowed; the Hanning window is used for implementing windowing operation of each speech signal frame in the multiple speech signal frames, to achieve the technical effects of periodically truncating each speech signal frame, avoiding leaking spectrum information and protecting the speech signal security.

In an embodiment, a $k^{th}$ second windowed signal frame in the multiple second windowed signal frames satisfies the following relationship:

$$x'_w[k, n - kM]h_s[n - kM], kM \leq n \leq kM + (N - 1); \text{ and}$$

the second speech signal satisfies the following relationship:

$$x'[n] = \sum_k x'_w[k, n - kM] h_s[n - kM]$$

M represents a quantity of overlapping sampling points of adjacent frames in the multiple speech signal frames, $x_w'[k, n-kM]$ is used for representing an $(n-kM)^{th}$ value in a $k^{th}$ first time domain signal frame, and $x'[n]$ is used for representing an $n^{th}$ value of the second speech signal; and the synthesis window $h_s$ includes:

$$h_s[n] = \begin{cases} 1, & 0 \leq n \leq N-1 \\ 0, & n < 0 \text{ or } n > N-1 \end{cases}$$

$h_s[n]$ is used for representing an $n^{th}$ item in the synthesis window $h_s$, and $h_s[n-kM]$ is used for representing an $(n-kM)^{th}$ item in the synthesis window $h_s$.

It is to be understood that the synthesis window may include, but is not limited to, the Hanning window and the rectangular window. Taking the rectangular window as an example, the description is shown in the above formula. After a $k^{th}$ first time domain signal frame is added with the synthesis window, a $k^{th}$ second windowed signal frame as $x_w'[k, n-kM]h_s[i-kM]$ can be obtained, to implement the technical effect of eliminating a window boundary and ensure that the processed speech signal is not damaged.

Accordingly, the second windowed signals are synthesized frame by frame through the synthesis window, to obtain the second speech signal. The second speech signal can be directly transmitted to a digital-to-analog conversion device such as a sound card for speech playback, so as to implement the technical effect of protecting the security of the speech signal at a playback end and outputting the speech signal securely at the playback end.

In an embodiment, a frame length of each speech signal frame in the multiple speech signal frames is N, the frame length N satisfying the following relationship:

$$N \approx \alpha \times f$$

f is a sampling frequency of the second device, and α is frame duration of each speech signal frame in the multiple speech signal frames.

The sampling frequency of the second device may be, but not limited to, preset by a system, and may further be adjusted based on different application scenarios or audio files in different formats. For example, common values are 11025 Hz, 22050 Hz, 24000 Hz, 44100 Hz, 48000 Hz, and so on. Because the speech signal is time-variant, and a feature change is small in a short period of time, overlapping points are arranged between adjacent frames as a measure of steady-state processing on the first speech signal.

In an embodiment, according to the Haas effect, an auditory persistence time of human ears is about 20 milliseconds; therefore, frame duration corresponding to the frame length N can be set to be about 20 milliseconds.

$$N \approx 0.02 \times f$$

That is, the quantity of overlapping points M of adjacent frames may be determined by the frame length, for example, may be but not limited to $$\frac{1}{2}N \text{ or } \frac{3}{4}N.$$

The above is only an example and is not limited in this embodiment.

In this embodiment, the Haas effect of human ears is used for determining the frame length, which can ensure that the speech signal after low-frequency aliasing is not perceptible by human ears, and implement a technical effect of offsetting a subjective influence of added aliasing on the human ears by using the Haas effect.

In an embodiment, the target frequency threshold being related to the sampling frequency of the second device includes:

the target frequency threshold being the same as an upper limit of the sampling frequency of the second device.

Specifically, the target frequency threshold may be approximately equal to an upper limit $f_{cap}$ of the sampling frequency of a built-in MEMS sensor in the terminal, that is: $f_{th} \approx f_{cap}$.

By setting the target frequency threshold that is consistent with the sampling frequency of the second device, a technical effect of ensuring that the sense of hearing remains unchanged and maintaining the sense of hearing of an original input speech signal can be implemented.

This application is further completely described below with reference to specific embodiments.

Figure 4:
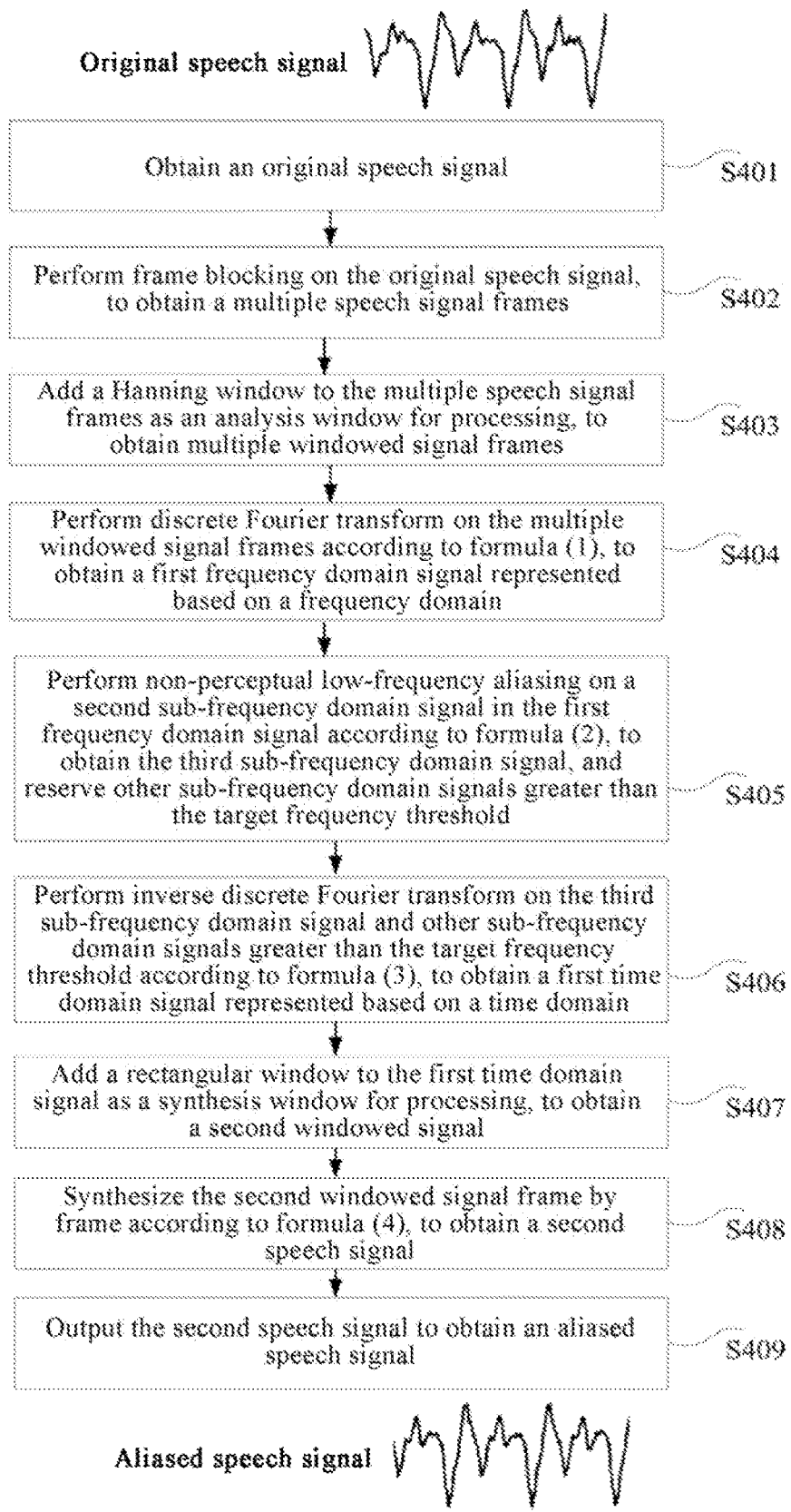
FIG. 4 is a schematic flowchart of a method for processing an audio signal according to another embodiment.

FIG. 4 is a schematic flowchart of a method for post-processing an audio signal according to another embodiment of the present disclosure. As shown in FIG. 4, operations of the process are as follows:

S401. Obtain an original speech signal (corresponding to the foregoing first speech signal).

S402. Perform frame blocking on the original speech signal, to obtain multiple speech signal frames.

S403. Add a Hanning window to the multiple speech signal frames as an analysis window for processing, to obtain multiple windowed signal frames.

S404. Perform discrete Fourier transform on the multiple windowed signal frames according to formula (1), to obtain a first frequency domain signal represented based on a frequency domain.

S405. Perform non-perceptual low-frequency aliasing on a second sub-frequency domain signal in the first frequency domain signal according to formula (2), to obtain the third sub-frequency domain signal, and retain other sub-frequency domain signals greater than the target frequency threshold.

when a low-frequency aliasing function is H[k,n], a $k^{th}$ frame of the frequency domain signal $X_w'[k,n]$ added with low-frequency aliasing is expressed as follows:

$$X_w'[k, n] = \begin{cases} X_w[k, n]H[k, n], n \le f_{th} \\ X_w[k, n], n > f_{th} \end{cases}$$

H[k,n] needs to satisfy a property of parity frame gain cancellation without loss of generality, and an implementation is as follows:

$$H[2k+1, n] = \frac{1}{H[2k, n]}$$

$$H[2k, n] = \mathcal{D}[k, n]$$

$\mathcal{D}$ [k,n] is a filter, and an odd-numbered frame of H[k,n] is a reciprocal of a corresponding even-numbered frame.

S406. Perform inverse discrete Fourier transform on the third sub-frequency domain signal and other sub-frequency domain signals greater than the target frequency threshold according to formula (3), to obtain a first time domain signal represented based on a time domain.

S407. Add a rectangular window to the first time domain signal as a synthesis window for processing, to obtain a second windowed signal.

S408. Synthesize the second windowed signal frame by frame according to formula (4), to obtain a second speech signal.

S409. Output the second speech signal to obtain an aliased speech signal.

The following four formulas may be specifically included:

$$X_w[k, n] = \Sigma_i x[i] h_a[i - kM] e^{-\frac{j2\pi i n}{N}} \quad (1)$$

$$X_w'[k, n] = \begin{cases} X_w[k, n]H[k, n], n \le f_{th} \\ X_w[k, n], x > f_{th} \end{cases} \quad (2)$$

$$x_w'[k, n] = \frac{1}{N} \sum_{i=0}^{N-1} X_w'[k, i] e^{\frac{j2\pi i n}{N}} \quad (3)$$

$$x'[n] = \Sigma_k x_w'[k, n - kM] h_s[n - kM] \quad (4)$$

In this embodiment, after seven operations including "frame blocking", "adding analysis window", "discrete Fourier transform", "non-perceptual low-frequency aliasing", "inverse discrete Fourier transform", "adding synthesis window" and "frame synthesis" are performed on the original speech signal, the aliased speech signal is outputted. Low frequency band of the outputted signal is aliased. Therefore, even if vibration information is acquired by a MEMS sensor that is sensitive to a low frequency, the MEMS sensor cannot correctly restore the original speech signal. At the same time, by alternately enhancing and attenuating low-frequency signals in adjacent frames, complexity of aliasing is improved, and subjective influence of added aliasing on the human ears is offset by the Haas effect. Accordingly, a speech signal on a playback side is protected without any hardware and software restrictions on the MEMS sensor.

For ease of description, the foregoing method embodiments are stated as a combination of a series of actions. However, a person skilled in the art is to know that this application is not limited to the described action sequence, because according to this application, some steps may be performed in another sequence or simultaneously. In addition, a person skilled in the art is also to understand that the embodiments described in this specification are all exemplary embodiments, and the involved actions and modules are not necessarily required by this application.

Figure 5:
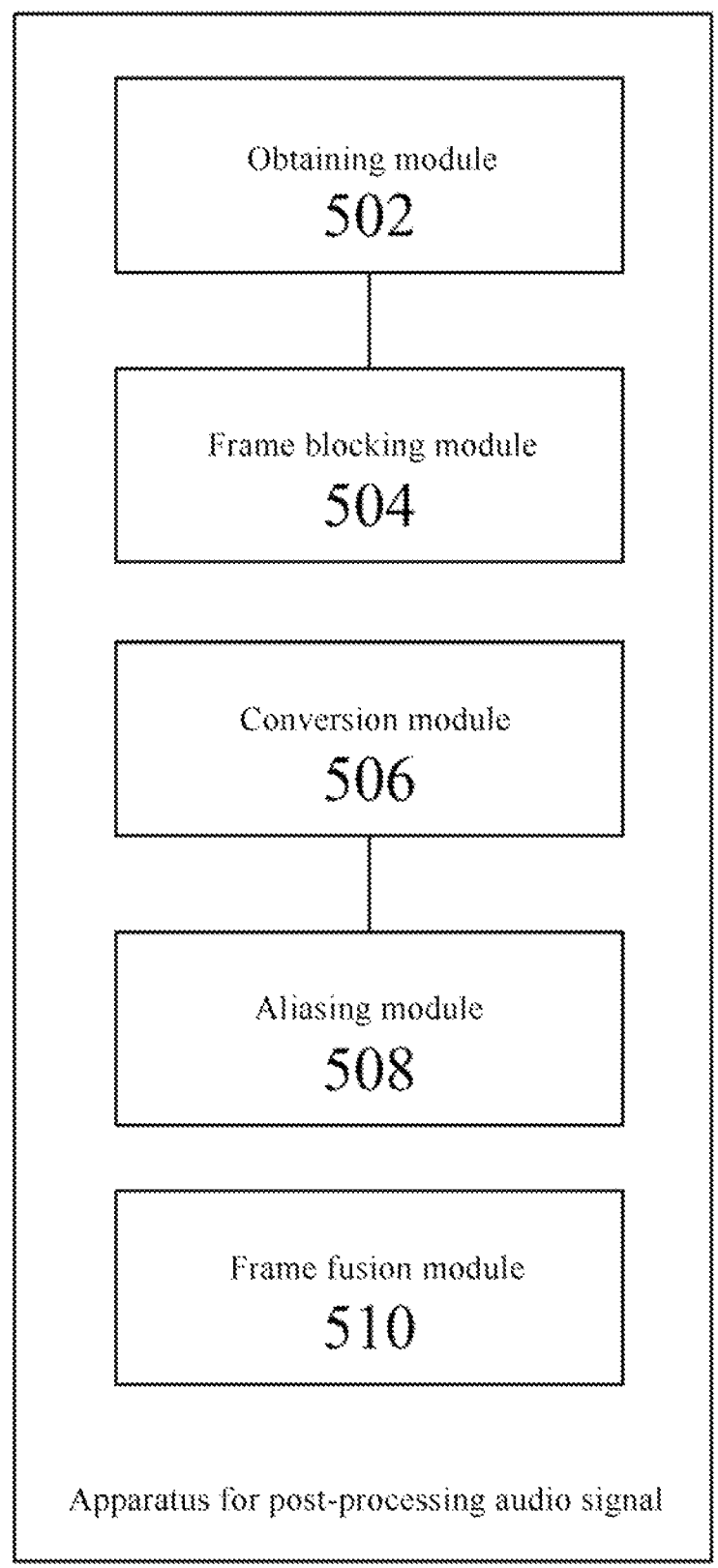
FIG. 5 is a schematic structural diagram of an apparatus for processing an audio signal according to an embodiment.

In an embodiment, an audio signal post-processing apparatus configured to perform a method for post-processing an audio signal is provided. As shown in FIG. 5, the apparatus includes:
- an obtaining module 502, configured to obtain a first speech signal acquired by a first device;
- a frame blocking module 504, configured to perform frame blocking on the first speech signal, to obtain multiple speech signal frames;
- a conversion module 506, configured to convert the multiple speech signal frames into multiple first frequency domain signal frames;
- an aliasing module 508, configured to perform aliasing processing on a first sub-frequency domain signal lower than or equal to a target frequency threshold in each first frequency domain signal frame in the multiple first frequency domain signal frames, and retain a second sub-frequency domain signal higher than the target frequency threshold in the each first frequency domain signal frame, to obtain multiple second frequency domain signal frames, the target frequency threshold being related to a sampling frequency of a second device; and
- a frame fusion module 510, configured to perform frame fusion on the multiple second frequency domain signal frames, to obtain a second speech signal.

Figure 6:
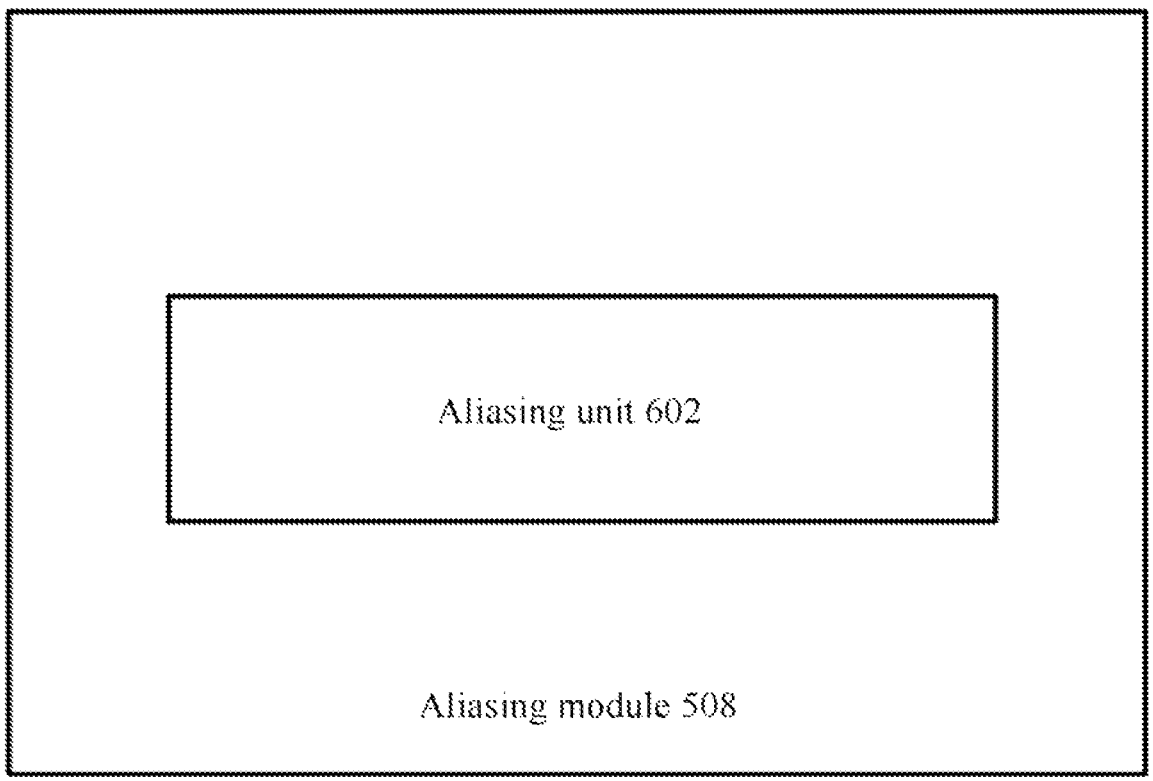
FIG. 6 is a schematic structural diagram of an aliasing module according to an embodiment.

In an embodiment, FIG. 6 is a schematic structural diagram of another audio signal post-processing apparatus according to an embodiment of the present disclosure. As shown in FIG. 6, the aliasing module 508 includes:
- an aliasing unit 602, configured to alternately enhance and attenuate the first sub-frequency domain signal in each first frequency domain signal frame, to obtain a third sub-frequency domain signal, and retain the second sub-frequency domain signal in each first frequency domain signal frame, to obtain the multiple second frequency domain signal frames.

Figure 7:
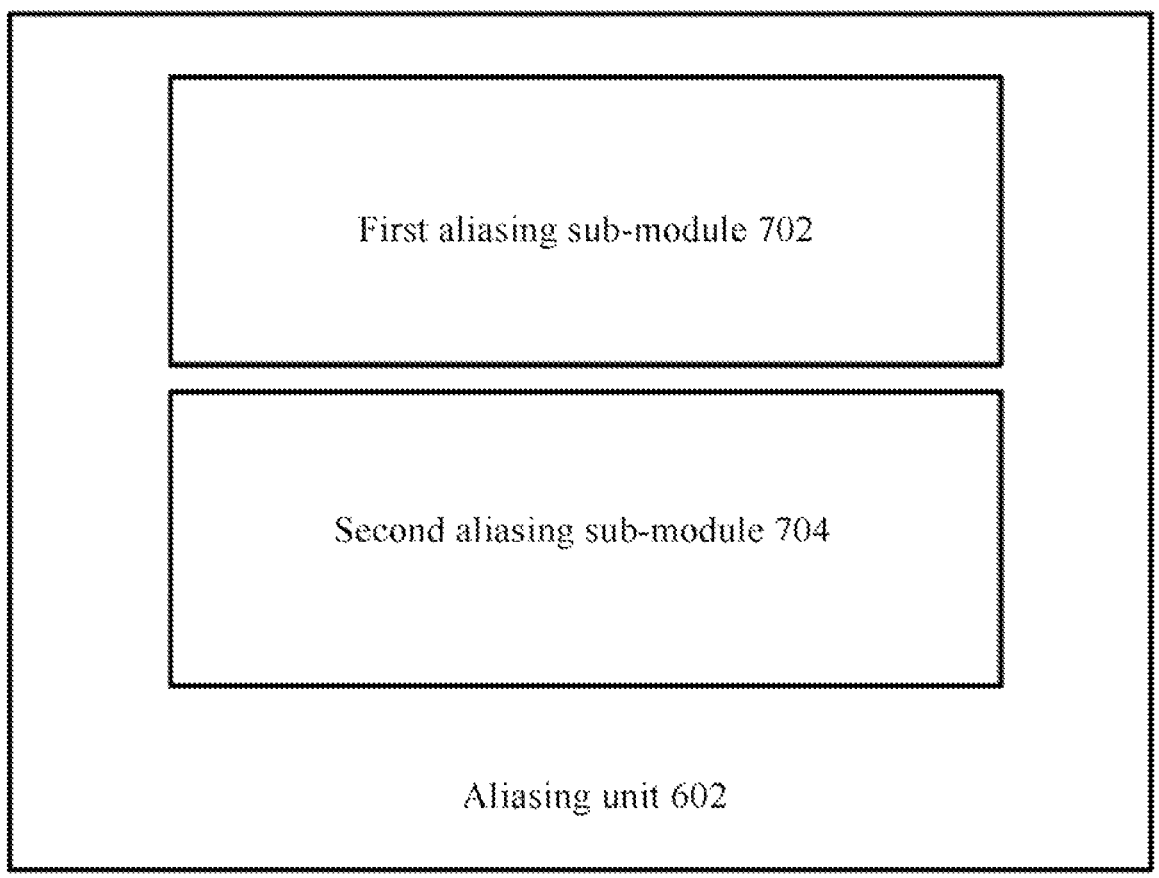
FIG. 7 is a schematic structural diagram of an aliasing unit according to an embodiment.

In an embodiment, FIG. 7 is a schematic structural diagram of another audio signal post-processing apparatus according to an embodiment of the present disclosure. As shown in FIG. 7, the aliasing unit 602 includes:
- a first aliasing sub-module 702, configured to obtain multiple second frequency domain signal frames satisfying the following relationship:

$$X'_w[k, n] = \begin{cases} X_w[k, n]H[k, n], & n \le f_{th} \\ X_w[k, n], & n > f_{th} \end{cases}$$

$H[k,n]$ is a low-frequency aliasing function of a $k^{th}$ frame, $f_{th}$ represents the target frequency threshold, and $X_w[k,n]$ is used for representing a $k^{th}$ first frequency domain signal frame; when $n \le f_{th}$, $X_w[k,n]$ is used for representing a first sub-frequency domain signal in the $k^{th}$ first frequency domain signal frame; when $n > f_{th}$, $X_w[k,n]$ is used for representing a second sub-frequency domain signal in the $k^{th}$ first frequency domain signal frame, $X_w[k,n]H[k,n]$ is used for representing a third sub-frequency domain signal obtained after aliasing processing is performed on the first sub-frequency domain signal in the $k^{th}$ first frequency domain signal frame, and $X_w'[k,n]$ is used for representing a $k^{th}$ second frequency domain signal frame.

In an embodiment, the aliasing unit 602 includes:
- a second aliasing sub-module 704, configured to obtain multiple second frequency domain signal frames satisfying the following relationship:

$$X'_w[k, n] = \begin{cases} X_w[k, n] + H[k, n], & n \le f_{th} \\ X_w[k, n], & n > f_{th} \end{cases}$$

$H[k,n]$ is a low-frequency aliasing function of a $k^{th}$ frame, $f_{th}$ represents the target frequency threshold, and $X_w[k,n]$ is used for representing a $k^{th}$ first frequency domain signal frame; when $n \le f_{th}$, $X_w[k,n]$ is used for representing a first sub-frequency domain signal in the $k^{th}$ first frequency domain signal frame; when $n > f_{th}$, $X_w[k,n]$ is used for representing a second sub-frequency domain signal in the $k^{th}$ first frequency domain signal frame, $X_w[k,n]H[k,n]$ is used for representing a third sub-frequency domain signal obtained after aliasing processing is performed on the first sub-frequency domain signal in the $k^{th}$ first frequency domain signal frame, and $X_w'[k,n]$ is used for representing a $k^{th}$ second frequency domain signal frame.

In an embodiment, the foregoing apparatus is further configured to: determine a low-frequency aliasing function $H[k,n]$ satisfying the following relationship:

$$H[2m + 1, n] = \frac{1}{H[2m, n]}$$

$$H[2m, n] = \mathcal{D}[m, n]$$

$\mathcal{D}[m,n]$ is a filter, $H[k,n]$ when k is an odd number is a reciprocal of $H[k,n]$ when k is an even number, and k includes $2m+1$ and $2m$.

In an embodiment, the foregoing apparatus is further configured to: determine a low-frequency aliasing function $H[k,n]$ satisfying the following relationship:

$$H[2m + 1, n] = -H[2m, n]$$

$$H[2m, n] = \mathcal{D}[m, n]$$

$\mathcal{D}[m,n]$ is a filter, $H[k,n]$ when k is an odd number is a negative number of $H[k,n]$ when k is an even number, and the k includes $2m+1$ and $2m$.

In an embodiment, the frame blocking module 504 includes: a frame blocking unit, configured to divide the first speech signal into the multiple speech signal frames according to frame duration determined based on a Haas effect and a preset sampling frequency;

the conversion module 506 includes: a first adding unit, configured to add an analysis window $h_a$ to each speech signal frame in the multiple speech signal frames, to obtain multiple first windowed signals; a first calculation unit, configured to perform discrete Fourier transform on each first windowed signal frame in the multiple first windowed signals, to obtain the multiple first frequency domain signal frames; and the frame fusion module 510 includes: a second calculation unit, configured to perform inverse discrete Fourier transform on each second frequency domain signal frame in the multiple second frequency domain signal frames, to obtain multiple first time domain signal frames; a second adding unit, configured to add a synthesis window $h_s$ to each first time domain signal frame in the multiple first time domain signal frames, to obtain multiple second windowed signal frames; a frame fusion unit, configured to perform frame fusion processing on the multiple second windowed signal frames, to obtain the second speech signal.

In an embodiment, a frame length N, the analysis window $h_a$ and the synthesis window $h_s$ satisfy the following relationship:

$$\sum_{n=0}^{N-1} h_a(n) h_s(n) = 1$$

$h_a(n)$ is used for representing an $n^{th}$ item in the analysis window $h_a$, and $h_s(n)$ is used for representing an $n^{th}$ item in the synthesis window $h_s$.

In an embodiment, a $k^{th}$ first windowed signal frame in the multiple first windowed signals satisfies the following relationship:

$$x[n]h_a[n - kM], kM \leq n \leq kM + (N - 1)$$

M represents a quantity of overlapping sampling points of adjacent frames in the multiple speech signal frames, x[n] is used for representing an $n^{th}$ value in a $k^{th}$ first windowed signal frame, and the analysis window $h_a$ includes:

$$h_a[n] = \begin{cases} \frac{1}{2}\left(1 - \cos\frac{2\pi n}{N-1}\right), & 0 \leq n \leq N-1 \\ 0, & n < 0 \text{ or } n > N-1 \end{cases}$$

$h_a[n]$ is used for representing an $n^{th}$ item in the analysis window $h_a$, and $h_a[n-kM]$ is used for representing an $(n-kM)^{th}$ item in the analysis window $h_a$.

In an embodiment, a $k^{th}$ second windowed signal frame in the multiple second windowed signal frames satisfies the following relationship:

$$x'_w[k, n - kM]h_s[n - kM], kM \leq n \leq kM + (N - 1);$$

and the second speech signal satisfies the following relationship:

$$x'[n] = \sum_k x'_w[k, n - kM]h_s[n - kM]$$

M represents a quantity of overlapping sampling points of adjacent frames in the multiple speech signal frames, $x_w'[k, n-kM]$ is used for representing an $(n-kM)^{th}$ value in a $k^{th}$ first time domain signal frame, and x'[n] is used for representing an $n^{th}$ value of the second speech signal; and the synthesis window $h_s$ includes:

$$h_s[n] = \begin{cases} 1, & 0 \leq n \leq N-1 \\ 0, & n < 0 \text{ or } n > N-1 \end{cases}$$

$h_s[n]$ is used for representing an $n^{th}$ item in the synthesis window $h_s$, and $h_s[n-kM]$ is used for representing an $(n-kM)^{th}$ item in the synthesis window $h_s$.

In an embodiment, a frame length of each speech signal frame in the multiple speech signal frames is N, the frame length N satisfying the following relationship:

$$N \approx \alpha \times f$$

f is a sampling frequency of the second device, and a is frame duration of each speech signal frame in the multiple speech signal frames.

In an embodiment, the target frequency threshold being related to the sampling frequency of the second device includes: the target frequency threshold being the same as an upper limit of the sampling frequency of the second device.

Figure 8:
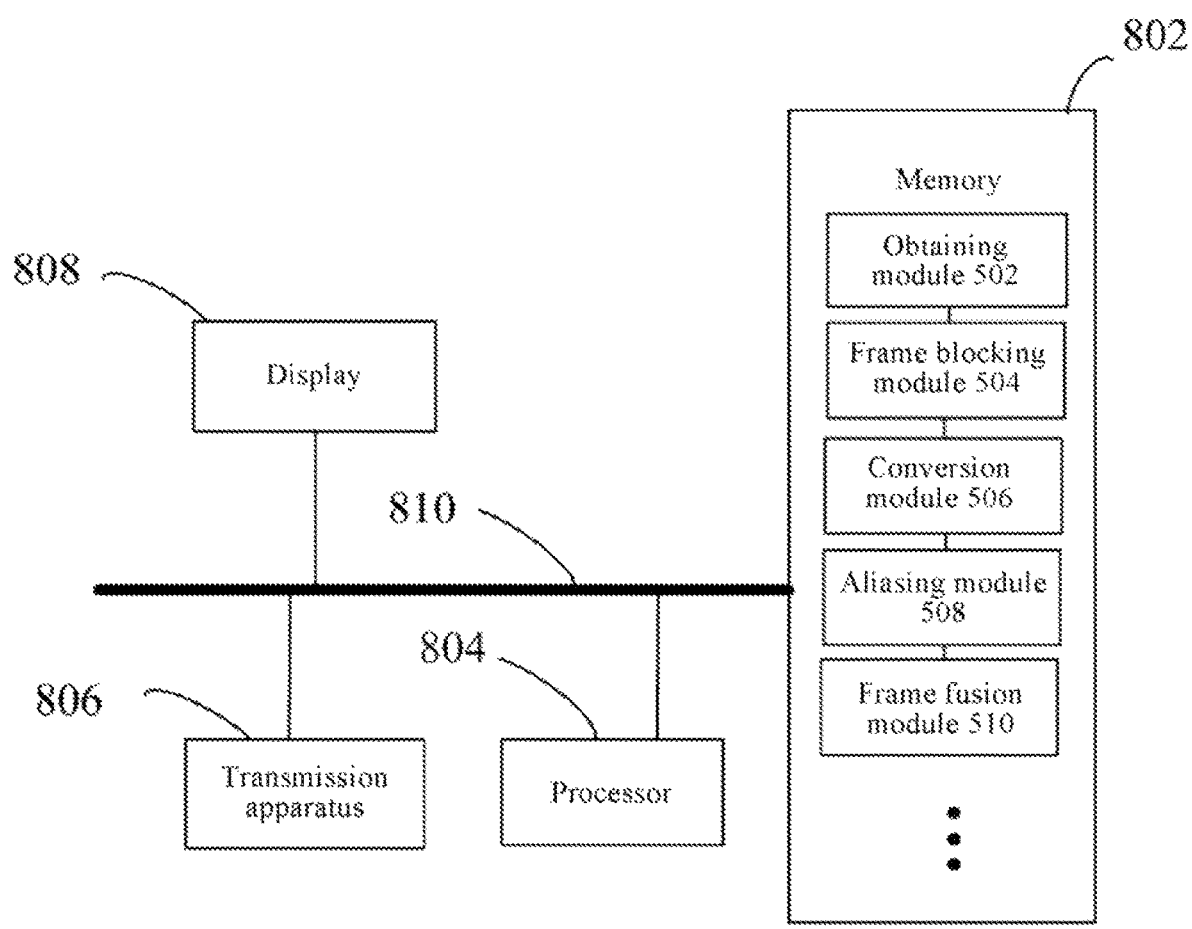
FIG. 8 is a schematic structural diagram of an electronic device according to an embodiment.

In an embodiment, an electronic device configured to implement the method for post-processing an audio signal is further provided. The electronic device may be a terminal device or a server shown in FIG. 1, or may be an electronic device disposed on a terminal and the server. As shown in FIG. 8, the electronic device includes a memory 802 and a processor 804. The memory 802 stores computer-readable instructions. The processor 804 is configured to perform the steps in any one of the foregoing method embodiments through the computer-readable instructions.

The electronic device may be located in at least one of a plurality of network devices in a computer network.

The processor on the electronic device may be configured to perform the following operations by executing the computer-readable instructions:

S1. obtaining a first speech signal acquired by a first device;

S2. performing frame blocking on the first speech signal, to obtain multiple speech signal frames;

S3. converting the multiple speech signal frames into multiple first frequency domain signal frames;

S4. performing aliasing processing on a first sub-frequency domain signal lower than or equal to a target frequency threshold in each first frequency domain signal frame in the multiple first frequency domain signal frames, and retaining a second sub-frequency domain signal higher than the target frequency threshold in the each first frequency domain signal frame, to obtain multiple second frequency domain signal frames, the target frequency threshold being related to a sampling frequency of a second device; and S5. performing frame fusion on the multiple second frequency domain signal frames, to obtain a second speech signal.

In some embodiments, a person of ordinary skill in the art may understand that, the structure shown in FIG. 8 is only schematic. The electronic apparatus or the electronic device may be a terminal device such as a smartphone (such as an Android mobile phone or an iOS mobile phone), a tablet computer, a palmtop computer, a mobile internet device (MID), or a PAD. FIG. 8 does not limit the structure of the electronic apparatus or the electronic device. For example, the electronic apparatus or the electronic device may further include more or fewer components (for example, a network interface) than those shown in FIG. 8, or have configuration different from that shown in FIG. 8.

The memory 802 may be configured to store a software program and a module, for example, a program instruction/module corresponding to a method and an apparatus for post-processing an audio signal in embodiments of the present disclosure, and the processor 804 performs various functional applications and data processing by running a software program and a module stored in the memory 802, that is, implementing the foregoing method for post-processing an audio signal. The memory 802 may include a high-speed random access memory, and may also include a non-volatile memory, for example, one or more magnetic storage apparatuses, a flash memory, or another non-volatile solid-state memory. In some examples, the memory 802 may further include memories remotely disposed relative to the processor 804, and the remote memories may be connected to a terminal through a network. The foregoing examples of the network include, but are not limited to, the Internet, an intranet, a local area network, a mobile communication network, and a combination thereof. The memory 802 may be specifically configured to, but is not limited to, information such as a speech signal. As an example, as shown in FIG. 8, the memory 802 may include, but is not limited to, the obtaining module 502, the frame blocking module 504, the conversion module 506, the aliasing module 508, and the frame fusion module 510 in the foregoing apparatus for post-processing an audio signal. In addition, the memory 802 may further include, but is not limited to, other modules and units in the foregoing apparatus for post-processing an audio signal, and details are not described herein again in this example.

In some embodiments, the foregoing transmission apparatus 806 is configured to receive or transmit data through a network. Specific examples of the foregoing network may include a wired network and a wireless network. In an example, the transmission apparatus 806 includes a network interface controller (NIC). The NIC may be connected to another network device and a router by using a network cable, to communicate with the Internet or a local area network. In an embodiment, the transmission apparatus 806 is a radio frequency (RF) module, which communicates with the Internet in a wireless manner.

In addition, the electronic device may further include: a display 808, configured to display information such as audio signal spectrum information during audio signal post-processing; and a connection bus 810, configured to connect module components in the electronic device.

In an embodiment, the electronic device may be a node in a distributed system. The distributed system may be a blockchain system. The blockchain system may be a distributed system formed by connecting a plurality of the nodes through network communication. The nodes may form a peer to peer (P2P) network. Computing devices in any form, for example, electronic devices such as a server and a terminal, can join the P2P network to become a node in the blockchain system.

In an embodiment, a computer-readable storage medium is provided. The computer-readable storage medium stores computer-readable instructions, the computer-readable instructions being configured to perform, when run, the operations in any one of the foregoing method embodiments.

The computer-readable storage medium may be configured to store computer-readable instructions configured to perform the following operations:

S1. obtaining a first speech signal acquired by a first device;

S2. performing frame blocking on the first speech signal, to obtain multiple speech signal frames;

S3. converting the multiple speech signal frames into multiple first frequency domain signal frames;

S4. performing aliasing processing on a first sub-frequency domain signal lower than or equal to a target frequency threshold in each first frequency domain signal frame in the multiple first frequency domain signal frames, and retaining a second sub-frequency domain signal higher than the target frequency threshold in the each first frequency domain signal frame, to obtain multiple second frequency domain signal frames, the target frequency threshold being related to a sampling frequency of a second device; and S5. performing frame fusion on the multiple second frequency domain signal frames, to obtain a second speech signal.

In an embodiment, a computer program product or a computer program is provided, the computer program product or the computer program including computer-readable instructions, the computer-readable instructions being stored in a computer-readable storage medium, a processor of a computer device reading the computer-readable instructions from the computer-readable storage medium, and the processor executing the computer-readable instructions, causing the computer device to perform the operations in the foregoing method embodiments.

A person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a read-only memory (ROM), a random access memory (RAM), a magnetic disk, an optical disk, and the like.

The sequence numbers of the embodiments of the present disclosure are merely for the description purpose but do not imply the preference among the embodiments.

When a unit or a module in the foregoing embodiments is implemented in the form of a software function unit and sold or used as an independent product, the integrated unit may be stored in the foregoing computer-readable storage medium. Based on such an understanding, the technical solutions of this application essentially, or a part contributing to the related art, or all or a part of the technical solution may be implemented in a form of a software product. The computer software product is stored in a storage medium and includes several instructions for instructing one or more computer devices (which may be a PC, a server, a network device, or the like) to perform all or some of steps of the methods in the embodiments of this application.

In the foregoing embodiments of this application, the descriptions of the embodiments have their respective focuses. For a part that is not described in detail in an embodiment, refer to related descriptions in other embodiments.

In the embodiments provided in this application, it is to be understood that the disclosed client may be implemented in other manners. The described apparatus embodiments are merely exemplary. For example, the unit division is merely logical function division, and may use other division manners in some embodiments. For example, a plurality of units or components may be combined or integrated into another system, or some features may be omitted or not performed. In addition, the coupling, or direct coupling, or communication connection between the displayed or discussed components may be the indirect coupling or communication connection by using some interfaces, units, or modules, and may be electrical or of other forms.

The units described as separate components may or may not be physically separate, and components displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

The foregoing descriptions are merely exemplary implementations of this application. A person of ordinary skill in the art may make some improvements and polishing without departing from the principle of this application and the improvements and polishing shall fall within the protection scope of this application.

What is claimed is:

1. A method for processing an audio signal, performed by an electronic device, the method comprising:
    obtaining a first speech signal acquired by a first device;
    performing frame blocking on the first speech signal, to obtain multiple speech signal frames;
    converting the multiple speech signal frames into multiple first frequency domain signal frames;
    performing aliasing processing on a first sub-frequency domain signal frame with a frequency lower than or equal to a target frequency threshold in each first frequency domain signal frame in the multiple first frequency domain signal frames, and reserving a second sub-frequency domain signal frame among the multiple first frequency domain signal frames with a frequency higher than the target frequency threshold in the each first frequency domain signal frame, to obtain multiple second frequency domain signal frames, the target frequency threshold being related to a sampling frequency of a second device, comprising:
        alternately enhancing and attenuating the first sub-frequency domain signal in the each first frequency domain signal frame, to obtain a third sub-frequency domain signal frame, and reserving the second sub-frequency domain signal in the each first frequency domain signal frame, to obtain the multiple second frequency domain signal frames, wherein a kth second frequency domain signal frame $X_w'[k,n]$ of the multiple second frequency domain signal frames equals to the third sub-frequency domain signal frame obtained after aliasing processing is performed on the first sub-frequency domain signal frame in a $k^{th}$ first frequency domain signal frame of the first frequency domain signal frames when a frequency value n is less than or equal to the target frequency threshold; and
    performing frame fusion on the multiple second frequency domain signal frames, to obtain a second speech signal.

2. The method according to claim 1, wherein the multiple second frequency domain signal frames satisfy the following relationship:

$$X_w'[k, n] = \begin{cases} X_w[k, n]H[k, n], & n \le f_{th} \\ X_w[k, n], & n > f_{th} \end{cases}$$

wherein H[k,n] is a low-frequency aliasing function of a $k^{th}$ frame, $f_{th}$ represents the target frequency threshold, and $X_w[k,n]$ represents the $k^{th}$ first frequency domain signal frame; when $n \le f_{th}$, $X_w[k,n]$ represents a first sub-frequency domain signal frame in the $k^{th}$ first frequency domain signal frame; when $n > f_{th}$, $X_w[k,n]$ represents a second sub-frequency domain signal frame in the $k^{th}$ first frequency domain signal frame, $X_w[k,n]$ H[k,n] represents the third sub-frequency domain signal frame obtained after the aliasing processing is performed on the first sub-frequency domain signal frame in the $k^{th}$ first frequency domain signal frame, and $X_w'[k,n]$ represents the $k^{th}$ second frequency domain signal frame.

3. The method according to claim 1, wherein the multiple second frequency domain signal frames satisfy the following relationship:

$$X_w'[k, n] = \begin{cases} X_w[k, n] + H[k, n], & n \le f_{th} \\ X_w[k, n], & n > f_{th} \end{cases}$$

wherein H[k,n] is a low-frequency aliasing function of a $k^{th}$ frame, $f_{th}$ represents the target frequency threshold, and $X_w[k,n]$ represents a $k^{th}$ first frequency domain signal frame; when $n \le f_{th}$, $X_w[k,n]$ represents a first sub-frequency domain signal frame in the $k^{th}$ first frequency domain signal frame; when $n > f_{th}$, $X_w[k,n]$ represents a second sub-frequency domain signal frame in the $k^{th}$ first frequency domain signal frame, $X_w[k, n]+H[k,n]$ represents the third sub-frequency domain signal frame obtained after aliasing processing is performed on the first sub-frequency domain signal frame in the $k^{th}$ first frequency domain signal frame, and $X_w'[k,n]$ represents the $k^{th}$ second frequency domain signal frame.

4. The method according to claim 1, wherein
    the performing frame blocking on the first speech signal, to obtain multiple speech signal frames comprises:
        dividing the first speech signal into the multiple speech signal frames according to frame duration determined based on a Haas effect and a preset sampling frequency;
    the converting the multiple speech signal frames into multiple first frequency domain signal frames comprises:
        adding an analysis window $h_a$ to each speech signal frame in the multiple speech signal frames to obtain multiple first windowed signals; and
        performing discrete Fourier transform on each first windowed signal frame in the multiple first windowed signals, to obtain the multiple first frequency domain signal frames;

the performing frame fusion on the multiple second frequency domain signal frames, to obtain a second speech signal comprises:

performing inverse discrete Fourier transform on each second frequency domain signal frame in the multiple second frequency domain signal frames, to obtain multiple first time domain signal frames;

adding a synthesis window $h_s$ to each first time domain signal frame in the multiple first time domain signal frames, to obtain multiple second windowed signal frames; and performing frame fusion on the multiple second windowed signal frames, to obtain the second speech signal.

5. The method according to claim 4, wherein a frame length N of each speech signal frame in the multiple speech signal frames, the analysis window $h_a$ and the synthesis window $h_s$ satisfy the following relationship:

$$\sum_{n=0}^{N-1} h_a(n) h_s(n) = 1$$

wherein $h_a(n)$ represents an $n^{th}$ item in the analysis window $h_a$, and $h_s(n)$ represents an $n^{th}$ item in the synthesis window $h_s$.

6. The method according to claim 1, wherein a frame length of each speech signal frame in the multiple speech signal frames is N, the frame length N satisfy the following relationship:

$$N \approx \alpha \times f$$

wherein f is the sampling frequency of the second device, and $\alpha$ is frame duration of each speech signal frame in the multiple speech signal frames.

7. The method according to claim 1, wherein the target frequency threshold being related to the sampling frequency of the second device comprises:

the target frequency threshold being the same as an upper limit of the sampling frequency of the second device.

8. An apparatus for processing an audio signal, comprising a memory and a processor coupled to the memory, the processor being configured to:

obtain a first speech signal acquired by a first device;

perform frame blocking on the first speech signal, to obtain multiple speech signal frames;

convert the multiple speech signal frames into multiple first frequency domain signal frames;

perform aliasing processing on a first sub-frequency domain signal frame with a frequency lower than or equal to a target frequency threshold in each first frequency domain signal frame in the multiple first frequency domain signal frames, and reserve a second sub-frequency domain signal frame among the multiple first frequency domain signal frames with a frequency higher than the target frequency threshold in the each first frequency domain signal frames, to obtain multiple second frequency domain signal frames, the target frequency threshold being related to a sampling frequency of a second device, comprising:

alternately enhancing and attenuating the first sub-frequency domain signal in the each first frequency domain signal frame, to obtain a third sub-frequency domain signal frame, and reserving the second sub-frequency domain signal in the each first frequency domain signal frame, to obtain the multiple second frequency domain signal frames, wherein a kth second frequency domain signal frame $X_w'[k,n]$ of the multiple second frequency domain signal frames equals to the third sub-frequency domain signal frame obtained after aliasing processing is performed on the first sub-frequency domain signal frame in a $k^{th}$ first frequency domain signal frame of the first frequency domain signal frames when a frequency value n is less than or equal to the target frequency threshold; and perform frame fusion on the multiple second frequency domain signal frames, to obtain a second speech signal.

9. The apparatus according to claim 8, wherein the multiple second frequency domain signal frames satisfy the following relationship:

$$X_w'[k, n] = \begin{cases} X_w[k, n] H[k, n], & n \leq f_{th} \\ X_w[k, n], & n > f_{th} \end{cases}$$

wherein H[k,n] is a low-frequency aliasing function of a $k^{th}$ frame, $f_{th}$ represents the target frequency threshold, and $X_w[k,n]$ represents the $k^{th}$ first frequency domain signal frame; when $n \leq f_{th}$, $X_w[k,n]$ represents a first sub-frequency domain signal frame in the $k^{th}$ first frequency domain signal frame; when $n > f_{th}$, $X_w[k,n]$ represents a second sub-frequency domain signal frame in the $k^{th}$ first frequency domain signal frame, $X_w[k,n]$ H[k,n] represents the third sub-frequency domain signal frame obtained after the aliasing processing is performed on the first sub-frequency domain signal frame in the $k^{th}$ first frequency domain signal frame, and $X_w'[k,n]$ represents the $k^{th}$ second frequency domain signal frame.

10. The apparatus according to claim 8, wherein the multiple second frequency domain signal frames satisfy the following relationship:

$$X_w'[k, n] = \begin{cases} X_w[k, n] + H[k, n], & n \leq f_{th} \\ X_w[k, n], & n > f_{th} \end{cases}$$

wherein H[k,n] is a low-frequency aliasing function of a $k^{th}$ frame, $f_{th}$ represents the target frequency threshold, and $X_w[k,n]$ represents a $k^{th}$ first frequency domain signal frame; when $n \leq f_{th}$, $X_w[k,n]$ represents a first sub-frequency domain signal frame in the $k^{th}$ first frequency domain signal frame; when $n > f_{th}$, $X_w[k,n]$ represents a second sub-frequency domain signal frame in the $k^{th}$ first frequency domain signal frame, $X_w[k, n]+H[k,n]$ represents the third sub-frequency domain signal frame obtained after aliasing processing is performed on the first sub-frequency domain signal frame in the $k^{th}$ first frequency domain signal frame, and $X_w'[k,n]$ represents the $k^{th}$ second frequency domain signal frame.

11. The apparatus according to claim 8, wherein the processor is further configured to:

divide the first speech signal into the multiple speech signal frames according to frame duration determined based on a Haas effect and a preset sampling frequency;

add an analysis window $h_a$ to each speech signal frame in the multiple speech signal frames, to obtain multiple first windowed signals; and perform discrete Fourier transform on each first windowed signal frame in the multiple first windowed signals to obtain the multiple first frequency domain signal frames;
perform inverse discrete Fourier transform on each second frequency domain signal frame in the multiple second frequency domain signal frames, to obtain multiple first time domain signal frames; add a synthesis window $h_s$ to each first time domain signal frame in the multiple first time domain signal frames, to obtain multiple second windowed signal frames; and perform frame fusion on the multiple second windowed signal frames, to obtain the second speech signal.

12. The apparatus according to claim 11, wherein a frame length N of each speech signal frame in the multiple speech signal frames, the analysis window $h_a$ and the synthesis window $h_s$, satisfy the following relationship:

$$\sum_{n=0}^{N-1} h_a(n)h_s(n) = 1$$

wherein $h_a(n)$ represents an $n^{th}$ item in the analysis window $h_a$, and $h_s(n)$ represents an $n^{th}$ item in the synthesis window $h_s$.

13. The apparatus according to claim 8, wherein the target frequency threshold being related to the sampling frequency of the second device comprises:
the target frequency threshold being the same as an upper limit of the sampling frequency of the second device.

14. A non-transitory computer-readable storage medium, storing computer-readable instructions, the computer-readable instructions, when executed by a processor, causing the processor to perform operations comprising:
obtaining a first speech signal acquired by a first device;
performing frame blocking on the first speech signal, to obtain multiple speech signal frames;
converting the multiple speech signal frames into multiple first frequency domain signal frames;
performing aliasing processing on a first sub-frequency domain signal frame with a frequency lower than or equal to a target frequency threshold in each first frequency domain signal frame in the multiple first frequency domain signal frames, and reserving a second sub-frequency domain signal frame among the multiple first frequency domain signal frames with a frequency higher than the target frequency threshold in the each first frequency domain signal frame, to obtain multiple second frequency domain signal frames, the target frequency threshold being related to a sampling frequency of a second device, comprising:
alternately enhancing and attenuating the first sub-frequency domain signal in the each first frequency domain signal frame, to obtain a third sub-frequency domain signal frame, and reserving the second sub-frequency domain signal in the each first frequency domain signal frame, to obtain the multiple second frequency domain signal frames, wherein a kth second frequency domain signal frame $X_w'[k,n]$ of the multiple second frequency domain signal frames equals to the third sub-frequency domain signal frame obtained after aliasing processing is performed on the first sub-frequency domain signal frame in a $k^{th}$ first frequency domain signal frame of the first frequency domain signal frames when a frequency value n is less than or equal to the target frequency threshold; and
performing frame fusion on the multiple second frequency domain signal frames, to obtain a second speech signal.

15. The method according to claim 2, wherein the low-frequency aliasing function H[k,n] of the $k^{th}$ frame satisfies the following relationship:

$$H[2m+1, n] = \frac{1}{H[2m, n]}$$
$$H[2m, n] = \mathcal{D}[m, n]$$

wherein $\mathcal{D}[m,n]$ is a filter, H[k,n] when k is an odd number is a reciprocal of H[k,n] when k is an even number, and the k includes 2m+1 and 2m.

16. The method according to claim 2, wherein the low-frequency aliasing function H[k,n] of the $k^{th}$ frame satisfies the following relationship:

$$H[2m+1, n] = \frac{1}{H[2m, n]}$$
$$H[2m, n] = \mathcal{D}[m, n]$$

wherein $\mathcal{D}[m, n]$ is a filter, H[k,n] when k is an odd number is a negative number of H[k,n] when k is an even number, and the k includes 2m+1 and 2m.

17. The method according to claim 4, wherein a $k^{th}$ first windowed signal frame in the multiple first windowed signals satisfies the following relationship:

$$h_a[n] = \begin{cases} \frac{1}{2}\left(1 - \cos\frac{2\pi n}{N-1}\right), & 0 \le n \le N-1 \\ 0, & n < 0 \text{ or } n > N-1 \end{cases}$$

wherein $h_a[n]$ represents an $n^{th}$ item in the analysis window $h_a$, and $h_a[n-kM]$ represents an $(n-kM)^{th}$ item in the analysis window $h_a$.

18. The method according to claim 4, wherein a second windowed signal frame in the multiple second windowed signal frames satisfies the following relationship:

$$x'[n] = \sum_k x_w'[k, n-kM]h_s[n-kM]$$

wherein M represents a quantity of overlapping sampling points of adjacent frames in the multiple speech signal frames, $x_w'[k, n-kM]$ represents an $(n-kM)^{th}$ value in a $k^{th}$ first time domain signal frame, and x'[n] represents an $n^{th}$ value of the second speech signal; and
the synthesis window $h_s$ comprises:

$$h_s[n] = \begin{cases} 1, & 0 \le n \le N-1 \\ 0, & n < 0 \text{ or } n > N-1 \end{cases}$$

wherein $h_s[n]$ represents an $n^{th}$ item in the synthesis window $h_s$, and $h_s[n-kM]$ represents an $(n-kM)^{th}$ item in the synthesis window $h_s$.

* * * * *